United States Patent [19]
Takeuchi et al.

[11] 3,811,116
[45] May 14, 1974

[54] DEVICE FOR DETECTING MENTAL IMPAIRMENT

[75] Inventors: Yasuhisa Takeuchi, Yokosuka; Hiromichi Nakamura, Yokohama, both of Japan

[73] Assignee: Nissan Motor Company, Limited, Yokahama, Japan

[22] Filed: July 13, 1973

[21] Appl. No.: 378,875

[30] Foreign Application Priority Data
July 15, 1972 Japan................ 47-71077

[52] U.S. Cl.............. 340/172.5, 340/279, 180/99
[51] Int. Cl... B60r 25/00, B60k 27/08, G05b 13/02
[58] Field of Search................ 340/172.5, 149, 279; 307/10 AT, 10 LS; 317/134; 180/99, 114; 250/199

[56] References Cited
UNITED STATES PATENTS

| | | | |
|---|---|---|---|
| 3,311,187 | 3/1967 | Haggard............................ | 180/99 X |
| 3,312,508 | 4/1967 | Keller et al. .................... | 340/279 X |
| 3,566,365 | 2/1971 | Rawson et al. ................. | 340/172.5 |
| 3,566,370 | 2/1971 | Worthington et al............ | 340/172.5 |
| 3,575,589 | 4/1971 | Neema et al..................... | 340/172.5 |
| 3,631,403 | 12/1971 | Asbo et al........................ | 340/172.5 |
| 3,681,758 | 8/1972 | Oster et al. ...................... | 340/172.5 |
| 3,691,396 | 9/1972 | Hinrichs.......................... | 317/134 X |
| 3,718,202 | 3/1973 | Brock ................................ | 180/114 |
| 3,735,381 | 5/1973 | Zadig................................ | 340/279 |
| 3,755,776 | 8/1973 | Kotras............................... | 180/99 X |

Primary Examiner—Paul J. Henon
Assistant Examiner—Jan E. Rhoads

[57] ABSTRACT

Herein disclosed is an apparatus adapted to determine a degree of fatigue or drunkness of an examinee, which apparatus includes circuits to produce a control voltage varying with time, convert the voltage into pulses having a repetition rate proportional to the control voltage, energize a light-emissive means to produce light at a frequency proportional to the pulse repetition rate, repeat these steps a desired number of times for obtaining voltages representative of critical flicker frequencies determined by the examinee from the flashes of the light-emissive means, produce information in voltage representative of an arithmetic means and an average deviation of the critical flicker frequencies determined, compare the voltages representing these pieces of information with prescribed reference voltages to see if the mean value of the critical flicker frequencies is larger than an acceptable level and the average deviation thereof about the mean value is smaller than an acceptable level. The apparatus may be incorporated in a power driven vehicle so that a power plant thereof is made inoperative if the examinee has been "diagnosed" as incompetent for operating the vehicle.

17 Claims, 16 Drawing Figures

DEVICE FOR DETECTING MENTAL IMPAIRMENT

BACKGROUND OF THE INVENTION

Serious hazards are entailed when motor vehicles or aircrafts are driven or maneuvered by persons who are drunk or overfatiuged, often causing grave accidents. The present invention relates to an apparatus which is adapted to inspect in simple procedures the mental control of the automobile driver or aircraft pilots and further to an apparatus to hold the automobile or aircraft inoperative when the conscious mental control of the driver or pilot is discouraged.

A variety of methods have thus far been proposed for the purpose of inhibiting a drunk person from driving a vehicle upon detection of a temporary failure of his memory or eyesight or an impaired response to external stimuli or through determination of the concentration of alcohol in the exhaled breath. All these methods are adapted to prevent the drunk person from driving the vehicles and are accordingly useless for coping with persons who are in a overfatigued or drugged condition. The overfatigued or drugged condition of the vehicle driver is often consequent on clumsy or erroneous operations and, after the driver has driven the vehicle for a prolonged period of time, such a condition is favourable to sleep, thus forming other significant causes of traffic accidents.

It is, therefore, an important object of the present invention to provide an apparatus which is adapted to examine a vehicle driver for not only alcoholized but seriously fatigued or drugged conditions before he works on the vehicle.

In order to achieve this purpose, the present invention proposes to utilize the phenomenon which is well known as the fusion of a flicker.

Periodic light stimuli are perceived as discrete flashes but, if the stimuli are given at a sufficiently increased frequency so that the persistent sensation from one stimulation curve overlaps the rise of the primary sensation from the succeeding stimulation, then the sensation will be the same as that for a continuous illumination. The periodic stimuli thus perceived as a steady illumination is known as the "fused flicker" and that frequency at which the periodic light stimuli are first perceived as the fused illumination is termed the "critical flicker frequency". In the field of cerebrology, the fused flicker has been utilized for the inspection of the cerebration so that the degree of fatigue of the cerebrum is known in simple steps through detection of the critical flicker frequency determined by the examinee. The degree of fatigue is usually represented by a decrement in percentage of the critical flicker frequency from the critical flicker frequency which is determined by the examinee when the examinee is assumed to have a normal or maximal mental control such as at the time of rising in the morning under normal or fatigue-free conditions. It is, in this regard, pointed out that a vehicle driver, who must be more or less involved in a mental labour during driving the vehicle, should be kept from driving the vehicle if the decrement in the critical flicker frequency determined by him is greater than about 5 per cent and could not properly operate the vehicle if the decrement exceeds about 10 per cent. Experiments have further indicated that the critical flicker frequency determined by an alcoholized person decreases about 5 to 10 per cent if the alcohol concentration in the exhaled air is of the order of 0.25 milligrams per liter.

To ensure safety of driving, therefore, arrangements may be made in the motor vehicles or aircrafts so as to warn those in need of rest or to forcibly inhibiting drunk or seriously fatigued or drugged persons from operating the vehicles or aircrafts if the decrements in the critical flicker frequency are larger than predetermined levels.

SUMMARY OF THE INVENTION

In accordance with the present invention, such arrangements are realized in an apparatus which comprises light emissive means adapted to produce light when electrically energized, power supply means including first switch means of self-holding characteristics, the first switch means being closed for starting the inspecting operation, a control voltage generating circuit including second switch means to be closed by the examinee and connected to the power supply means through the first switch means for producing successive control voltages each having a waveform which varies continuously with time until the second switch means is closed, a pulse shaping circuit which is connected between the light emissive means and the control voltage generating circuit for producing pulses of a repetition rate which is substantially proportional to the control voltage and for thereby energizing the light emissive means with a frequency equal to the pulse repetition rate, a multiplicity of memory circuits each connected to the control voltage generating circuit and responsive to closing of the second switch for registering the voltage produced from the control voltage generating circuit at an instant when the second switch means is closed by the examinee, a counting circuit for monitoring the number of times the second switch means have been closed and for causing the memory circuits to sequentially register the voltages they receive from the control voltage generating circuit at the instants when the second switch means is closed, a mean-value calculating circuit having input terminals respectively connected to the memory circuits for producing an output voltage which is representative of an arithmetic mean value of the voltages registered on the memory circuits, a first comparator for comparing the output voltage from the mean-value calculating circuit with a prescribed reference voltage for producing an output voltage if and when the former is higher than the latter, a deviation calculating circuit having input terminals connected to the memory circuits and the mean-value calculating circuit for producing an output voltage which is representative of an average or standard deviation of the output voltages from the memory circuits about the output voltage delivered from the mean-value calculating circuit, a second comparator for comparing the output voltage from the deviation calculating circuit with a prescribed reference voltage for producing an output voltage if and when the former is smaller than the latter, and a gating circuit having input terminals which are respectively connected to the first and second comparators if and when the output voltages are concurrently produced from both of the first and second comparators.

The second switch means is manually closed by the examinee every time the examinee recognizes on the light emissive means a change from a continuous illumination to discrete flashes or, conversely, a change from discrete flashes to a continuous illumination. The voltages registered on the memory circuits are accordingly representative of the critical flicker frequencies which are determined by the examinee in the successive examination cycles and, thus, the voltage produced by the mean-value calculating circuit indicates an arithmetic mean of the critical flicker frequencies. The delivery of the output voltage from the switching circuit which is arranged at the final stage of the apparatus above described will therefore suggest the fact that the mean value of the critical flicker frequencies determined by the examinee is larger than a predetermined acceptable level which is dictated by the reference voltage applied to the first comparator and that the average or standard deviation of the critical flicker frequencies about the mean value is smaller than a predetermined acceptable level which is represented by the reference voltage impressed on the second comparator. The apparatus of the construction above described is therefore adapted to determine whether or not the examinee is in a mental condition competent for the intended mental labour. Where it is desired that the condition of the apparatus indicating the result of the examination be maintained for a predetermined period of time, the apparatus may further comprise a signal holding circuit connected to an output terminal of the previously mentioned switching circuit and including a third switch means of self-holding characteristics. The third switch means is adapted to remain closed for a predetermined period of time after the holding circuit is energized by the output voltage from the switching circuit.

The apparatus of the above described nature will thus be useful in itself for the purpose of inspecting and, where desired, registering the degree of fatigue of the examinee. As previously noted, however, the apparatus may be more advantageously incorporated in an automobile or an aircraft for tee purpose of inhibiting the examinee from operating the automobile or aircraft if the examinee is proved to be in a condition incompetent for operating the same. To achieve this end, the apparatus may be combined with an electric line which is connected across a normally open switch means between the previously mentioned power supply means and any of electrically operated elements of a power plant of the motor vehicle or the aircraft so that the particular elements are energized from the power supply means. The normally-open switch means is responsive to the previously mentioned third switch means incorporated into the signal holding circuit and is thus closed in response to closing of the third switch means, viz., only when the examinee has been proved to be competent for the intended operation.

BRIEF DESCRIPTION OF THE DRAWINGS

The various features and advantages of the apparatus according to the present invention will become more apparent from the following description taken in conjunction with the accompanying drawings in which.

DETAIL DESCRIPTION

Figure 1:
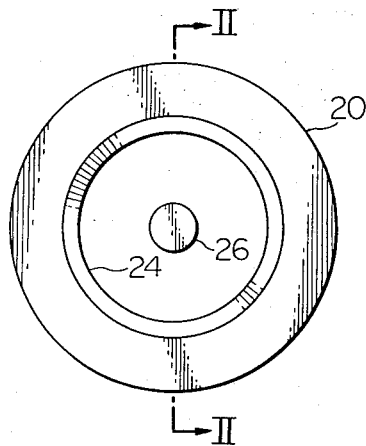
FIG. 1 is a front end view of a flash light assembly incorporated into the apparatus embodying the present invention.
Figure 2:
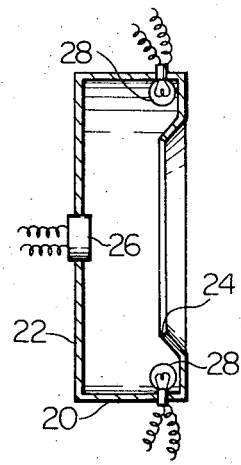
FIG. 2 is a cross sectional view of the flash light assembly taken on line II—II of FIG. 1.

Reference will now be made to the drawings, first to FIGS. 1 and 2 which illustrate an example of the flash light assembly incorporated in the apparatus according to the present invention. The flash light assembly includes a casing 20 having a dsic-sahped bottom wall 22 and a circular opening 24 over the bottom wall 22. The disc-shaped bottom wall 22 carries thereon a flash plate 26 which is adapted to produce light when electrically energized. The flash plate 26 may thus be formed of a light-emissive material such as liquid crystals or an electroluminescent semiconductor such as a light-emissive diode or, otherwise, may be combined with a sector plate which is rotatable relative to the flash plate and a usual light positioned behind the sector plate so that slashes are produced as the sector plate is driven from a suitable driving source. Designated by reference numeral 28 are lights which are positioned around the flash plate 26 for the purpose of constnatly illuminating the bottom wall 22 of the casing 20 during examination.

Figure 3:
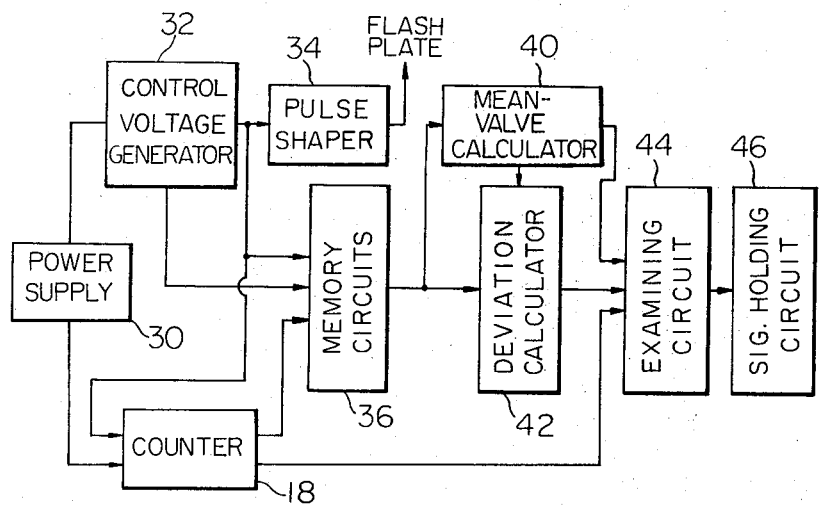
FIG. 3 is a block diagram showing an overall electrical arrangement of the apparatus according to the present invention.

The flash light assembly thus constructed is positioned within a motor vehicle or an aircraft usually in the neighbourhood of the driver's or pilot's seat, though not shown. During examination of the mental control of an examinee, who, in this instance, is assumed to be an intending vehicle driver or aircraft pilot, the flash plate 26 is caused to flicker at a frequency which is controlled by the electrical arrangement illustrated in FIG. 3. Referring to FIG. 3, a power supply circuit 30 includinng a self-holding switch (not shown) supplies a high-tension direct current to a control voltage generating circuit 32 including a switch (not shown) which is to be closed by the examinee. The control signal generating circuit produces successive control voltages each having a waveform continuously varying with time until the switch incorporated in the circuit is closed by the examinee. The control voltage thus produced by the circuit 32 is fed to a pulse shaping circuit 34 which then produces a train of pulses at a repetition rate which is substantially proportional to the control voltage delivered from the control voltage generating circuit 32. The pulse shaping circuit 34 has an output terminal connected to the flash plate 26 of the flash light assembly shown in FIGS. 1 and 2 or to the driving source for the sector plate rotatable relative to the flash plate 26. The flash plate 26 is consequently caused to flicker at a frequency which is equal to or dictated by the repetition rate of the pulses produced from the pulse shaping circuit 34. Ech of the control voltages which are successively delivered from the control voltage generating circuit 32 may be continuously increased or decreased so that a steady illumination incipiently produced on the flash plate 26 is changed to discrete flashes as tee time lapses or discrete flashes initially appearing on the flash plate 26 is changed to a steady illumination toward the end of the cycle of voltage. In whichsoever form the flicker may be produced on the flash plate 26, the examinee closes the switch in the control voltage generating circuit 32 at an instant when he recognizes the transition between the steady illumination and the discrete flashes. The frequency of the flicker on the flash plate 26 thus determined by the examinee is the critical flicker frequency.

The control voltage generating circuit 32 is also connected to a network 36 of memory circuits which are responsive to the switch incorporated in the circuit 32. A counting circuit 38 energized from the power supply circuit 30 is operative to monitor the number of the successive voltages delivered from the control voltage generating circuit 32. The counting circuit 38 is connected to the memory circuit network 36 so as to cause the memory circuits to sequentially register the voltages fed thereto at the instants when the switch in the circuit 32 is closed by the examinee.

The voltages thus registered on the individual memory circuits 36 are, in effect, representative of the critical flicker frequencies determined by the examinee and are fed to a mean-value calculating circuit 40 and a deviation calculating circuit 42. The mean-value calculating circuit 40 is operative to produce an output voltage which is an arithmetic mean of the voltages fed thereto, while the deviation calculating circuit 42 is operative to produce an output voltage which is indexed as an average (or standard, if desired) deviation of the voltages fed thereto about the voltage delivered thereto from the mean-value calculating circuit 40. The output voltages delivered from the calculating circuits 40 and 42 are fed to an examining circuit 44 for comparison with predetermined reference voltages. If the mean value and the deviation of the critical flicker frequencies determined by the examinee is proved to be acceptable in the examining circuit 44 and provided the switch in the control voltage generating circuit 32 is confirmed by the counting circuit 36 to have been closed a predetermined number of times, then the examining circuit 44 produces an output voltage which is, thus indicative of the fact that the examinee has an acceptable mental control and is free from any causes prohibiting the examinee from operating the motor vehicle or the aircraft. A signal holding circuit 46 may be connected to an output terminal of the examining circuit 44 for the purpose of maintaining the result of the examination for a predetermined period of time after the examination has been completed.

Detailed constructions, each in a preferred form, of the individual circuits 30 to 46 above described are illustrated in FIGS. 4 to 14.

Figure 4:
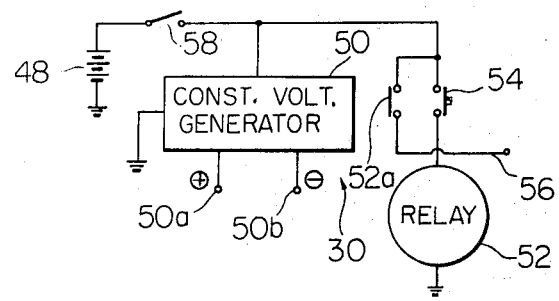
FIG. 4 is a diagram showing a preferred example of the power supply circuit forming part of the electrical arrangement illustrated in FIG. 3.

Referring to FIG. 4, the power supply circuit 30 comprises a d.c. power source 48 and a constant-voltage generator 50 having positive and negative output terminals 50a and 50b, respectively. The d.c. power source 48 and the constant-voltage generator 50 are connected in parallel to a relay 52 through an examination-start switch 54. The relay 52 has normally open contacts 52a across which the d.c. power source 48 and the constant-voltage generator 50 are connected to a line 56. The d.c. power source 48 may be a battery usually used to energize an electric equipment (not shown) of a power plant of the motor vehicle or the aircraft. In this instance, the power supply circuit 30 may further comprise a switch 58 arranged in a line connecting the d.c. power source 48 to the constant-voltage generator 50 and the relay 52. The switch 58 may thus be an ignition switch where the shown power supply circuit is to be incorporated into an automotive internal combustion engine (not shown).

The relay 52 is arranged so as to have self-holding characteristics so that, once the examination-start switch 54 is closed with the switch 58 closed, the contacts 52a of the relay 52 remain closed until the examination is complete.

Figure 5:
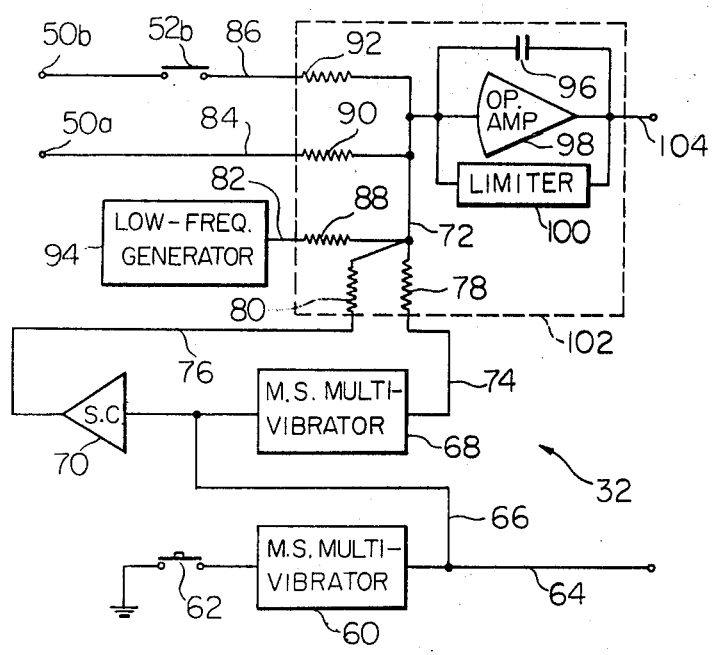
FIG. 5 is a diagram showing a preferred example of the control voltage generating circuit of the arrangement illustrated in FIG. 3.

Turning to FIG. 5, there is illustrated a detailed construction of the control voltage generating circuit 32. The control voltage generating circuit 32 comprises a first monostable multivibrator 60 having one terminal connected to ground across a response switch 62. The response switch 62 is closed repeatedly by the same examinee when the recognizes the critical flicker frequencies during examination, as will be described in more details. The monostable multivibrator 60 has an output terminal which is connected to lines 64 and 66. The line 64 is connected to the counting circuit 38 (FIG. 3) as will be discussed later, while the line 66 is connected in parallel to input terminals of a second monostable multivibrator 68 and a signal converter 70 which is adapted to convert the polarity of the voltage applied thereto. The multivibrator 68 and the signal converter 70 have output terminals connected in parallel to a line 72 through lines 74 and 76 having resistors 78 and 80, respectively. In parallel to the line 72 are further connected lines 82, 84 and 86 having resistors 88, 90 and 92, respectively. The line 82 is connected at one end to a low-frequency oscillator 94 which is adapted to produce a low-frequency voltage having a waveform that varies continuously with time, the waveform being herein assumed to be a sinusoidal waveform. The line 84 is connected to the positive output terminal 50a of the constant-voltage generator 50 of the power supply circuit 30 shown in FIG. 4, while the line 86 is connected to the negative output terminal 50a of the constant-voltage generator 50 across a second set of normally-closed contacts 52b of the relay 52 of the power supply circuit 30. The line 72 thus connected in parallel to the resistors 37, 80, 88, 90 and 92 is connected in parallel to a feedback capacitor 96, an operational amplifier 98 and a voltage limiter 100. The combination of the resistors 78, 80, 88, 90 and 92, the feedback capacitor 96, the operational amplifier 98 and the voltage limiter 100 thus constitutes an integrating circuit 102 as indicated by broken lines in FIG. 5. The integrating circuit 102 has an output terminal connected to line 104. The voltage limiter 100 is intended to limit an output voltage of the integrating circuit 102 wihtin an appropriate range which is herein assumed to be between zero and the level of the positive output voltage delivered from the constant-voltage generator 52 of the power supply circuit 30 (FIG. 4).

The integrating circuit 102 operates to integrate with respect to time the sum of the products of the voltages on the lines 74, 76, 82, 84 and 86 multiplied by prescribed parameters which are dictated by the resistance values of the resistors 78, 80, 88, 90 and 92.

When, in operation, the response switch 62 is closed by the examinee in response to the appearance of discrete flashes on the flash plate 26 (FIGS. 1 and 2), the first monostable multivibrator 60 delivers a signal voltage of a certain duration on the lines 64 and 66. The voltage is thus fed through the line 66 to the second monostable multivibrator 68 and the signal converter 70. The monostable multivibrator 68 is adapted to produce a negative output voltage of a certain duration when the voltage on the line 66 disappears, viz., at the fall time of the voltage produced by the first monostable multivibrator 60. On the other hand, the signal converter 62 produces a negative output voltage which is equal in absolute value to the voltage appearing on line 66. The voltage delivered from the integrating circuit 102 to the line 104 is, therefore, determined by the negative voltages produced by the second monostable multivibrator 68 and the signal converter 70, the sinusoidal voltage produced by the low-frequency oscillator 82, and the positive and negative voltages appearing on the positive and negative output terminals 50a and 50b, respectively, of the constant-voltage generator 50 (FIG. 4) as well as by the resistance values of the resistors 78, 80, 88, 90 and 92 forming part of the integrating circuit 102.

The line 104 from the integrting circuit 102 is connected to an input terminal of the previously mentioned pulse shaping circuit 34 (FIG. 3) so that the latter produces a train of pulses at a frequency which is substantially proportional to the voltage appearing on the line 104.

Figure 6:
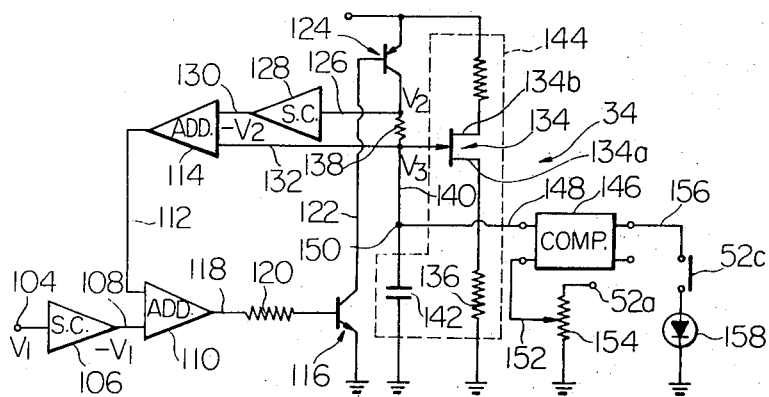
FIG. 6 is a diagram showing a preferred example of the pulse shaping circuit to be connected to the circuit illustrated in FIG. 5.

Referring to FIG. 6, the pulse shaping circuit 34 includes a signal converter 106 having an input terminal connected to the line 104. If, in this instance, the input voltage applied to the signal converter 106 is given by $V_1$, then the signal converter 106 delivers an output voltage equal to $-V_1$. The signal converter 106 has an output terminal connected through a line 108 to one input terminal of an adder 110 which has two input terminals. The other input terminal of the adder 110 is connected through a line 112 to an output terminal of a second adder 114. An n-p-n transistor 116 has a base connected to an output terminal of the first adder 110 through a line 118 having a resistor 120. The transistor 116 has an emitter electrode connected to ground and a collector electrode connected through a line 122 to the base of a p-n-p transistor 124. The second transistor 124 has a collector electrode hich is connected through a line 126 to an input terminal of a signal converter 128. The signal converter 128 has an output terminal connected through a line 130 to one input terminal of the above mentioned adder 114 which has two input terminals. The other input terminal of this adder 114 is connected through a line 132 to the emitter electrode of a unijunction or double-based transistor 134. The unijunction transistor 134 has a first bae 134a grounded through a resistor 136 and a second base 134b connected through a resistor 138 to the emitter electrode of the p-n-p transistor 124. Between the collector electrode of the transistor 124 and the line 130 is connected a resistor 138 which in turn is connected to groun through a line 140 in which a capacitor 142 is interposed. The combination of the unijunction transistor 134, the resistor 136 and the capacitor 142 forms an oscillator circuit 144 which is indicated by broken lines in FIG. 6.

The above described circuit arrangement including the first and second transistors 116 and 124, respectively, is such that a current proportional to the voltage across the resistor 120 on the line 118 appears on the collector electrode of the second transistor 124, as will be understood from the following analysis. Assuming that the terminal voltages of the resistor 136 are $V_2$ at the line 126 and $V_3$ at the line 132, a voltae $-V_2$ will appear on the line 130 between the signal converter 128 on the adder 114. The adder 114 thus receiving the voltages $-V_2$ and $V_3$ from the lines 130 and 132, respectively, produces a voltage $V_2-V_3$ so that, since the voltage $-V_1$ is delivered from the signal converter 106, the adder 110 produces an output voltage equal to $V_1-(V_2-V_3)$. The voltage across the resistor 120 is consequently given by $\alpha[V_1-(V_2-V_3)]$ where $\alpha$ is a parameter which is dictated by the resistor 120. If, in this instance, the resistor 138 has a resistance $r$ and the current flowing therethrough is $i$, then there will hold $$i = (V_2 - V_3)/r \qquad \text{Eq. 1}$$

Assuming that a current of $\beta$ amperes flows through the resistor 138 when a voltage of 1 volt is present across the resistor 120, the following relation will hold $$i = \alpha \cdot \beta [V_1 - (V_2 - V_3)] \qquad \text{Eq. 2}$$

From Eqs. 1 and 2, the value $i$ can be written in the form $$i = (\alpha \cdot \beta/1 + \alpha \cdot \beta \cdot r) \cdot V_1, \qquad \text{Eq. 3}$$

from which it is apparent that the current flowing through the resistor 138 to the collector electrode of the transistor 124 is proportional to the voltage $V_1$ which is fed to the input terminal of the pulse shaping circuit 34.

If, then, the current $i$ flowing from the resistor 138 to the capacitor 142 which forms part of the oscillator circuit 144 is constant, then the voltage on the line 132 assumes a sawtooth waveform of a certain frequency, as is well known in the art. As the current flowing through the resistor 138 increases, the capacitor 142 is charged at an increasing rate so that the frequency of the waveform, viz., the voltage delivered from the oscillator circuit 144 increases until it becomes substantially proportional to the current $i$. Since the current $i$ is proportional to the voltage $V_1$ as mentioned above, the oscillation frequency achieved by the oscillator circuit 144 is substantially proportional to the voltage $V_1$ supplied from the control voltage generating circuit 32 (FIG. 5).

The output voltage thus produced by the oscillator circuit is fed to a comparator 146 having two input terminals. One input terminal of the comparator is connected through a line 148 to a node between the resistor 138 and the capacitor 142 and the other input terminal thereof is connected through a line 152 to a variable resistor 154. The variable resistor 154 is grounded at one end and connected at the other to the positive output terminal 50a of the constant voltage generator 50 of the previously described power supply circuit 30 (FIG. 4). The variable resistor 154 is so set that a voltage of a prescribed level is supplied to the second input terminal of the comparator 146. The comparator 146 thus compares the voltage fed thereto from the oscillator circuit 144 with the reference voltage thus determined by the variable resistor 154 and delivers an output voltage when the former is higher than the latter. Since, in this instance, the voltage delivered from the oscillator circuit 144 has a sawtooth waveform having a frequency proportional to the voltage $V_1$ supplied from the control voltage generating circuit 32 as previously noted, the output produced from the comparator 146 is in the form of pulses having a frequency proportional to the voltage $V_1$ and pulsewidths which are determined by the amplitude of the waveform of the reference voltage supplied from the variable resistor 154.

The comparator has an output terminal which is connected through a line 156 to an electroluminescent semiconductor element such as a light-emissive diode 158 which is adapted to produce light when energized as is well known. The light-emissive diode 158 is associated with or incorporated into the flash plate 26 of the flash light assembly 20 previously described with reference to FIGS. 1 and 2. The light-emissive diode 158 thus flickes with a frequency equal to or at least proportional to the repetition rate of the pulses supplied thereto from the comparator 146. In the line 156 interconnecting the output terminal of the comparator 146 and the light-emissive diode 158 may be interposed a third set of normally-open contacts 52c of the relay 52 incorporated into the power supply circuit 30 (FIG. 4) so that the light-emissive diode 158 remains disconnected from the pulse shaping circuit 34 when the relay 52 is de-energized with the examination-start switch 54 open.

As previously noted, the control voltages each having a waveform continuously varying with time are delivered from the control voltage generating circuit 32 in cycles each terminating in response to closing of the response switch 62. To ensure accuracy and reliability of the results of examination, it is important that the response switch 62 be closed an appropriate number of times so that a sufficient a amount of information is stored in the memory circuits 36. The number of times the response switch 62 has been closed, viz., the number of the cycles in which the control voltages are delivered from the control voltage generating circuit 32 after the examination-start switch 54 has been closed is counted by the counting circuit 38. The counting circuit 38 thus monitors the number of the cycles in which the control voltages are delivered from the control voltage generating circuit 32 and instructs the memory circuits 36 to temporarily store the pieces of information supplied thereto from the circuit 32. A detailed construction of the counting circuit 38 is illustrated in FIG. 7.

Figure 7:
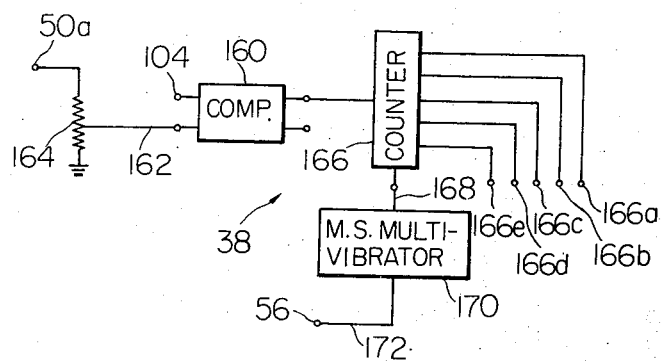
FIG. 7 is a diagram showing a preferred example of the counting circuit which is also to be connected to the control voltage generating circuit illustrated in FIG. 5.

Referring to FIG. 7, the counting circuit comprises a comparator 160 having two input terminals. One input terminal of the comparator 160 is connected to the output terminal of the control voltage generatint circuit 32 through the line 104 and the other input terminal thereof is connected through a line 162 to a variable resistor 164. The variable resistor 164 is grounded at one end and connected at the other to the positive output terminal 50a of the constant-voltage generator 50 of the power supply circuit 30 (FIG. 4). The variable resistor 164 is adapted to supply a prescribed reference voltage to the comparator 160 so that the comparator produces an output voltage when the voltage fed thereto through the line 104, viz., the output voltage delivered from the control voltage generator in every cycle is higher than the reference voltage. The comparator 160 has an output terminal connected to one input terminal of a counter 166. The counter 166 has a second input terminal which is connected through a line 168 to a monostable multivibrator 170. The monostable multivibrator 170, in turn, is connected through a line 172 to the output terminal 56 of the power supply circuit 30 (FIG. 4). The multivibrator 170 operates in a manner to produce an output voltage of a predetermined duration on the line 168 when it receives the output voltage from the terminal 56 of the power supply circuit 30. The output voltage thus supplied from the monostable multivibrator 170 triggers the counter 170 at the moment the examination-start switch 54 is closed by the examinee. The counter 166 has a plurality of output terminals the number of which may be selected in dependence upon the desired number of times the response switch 62 (FIG. 5) is to be closed in one examining operation. In the embodiment herein described, it is assumed by way of example that the response switch should be closed and accordingly the critical flicker frequency should be determined four times in one examining operation and, as such, the counter 166 is shown as having five output terminals 166a to 166e for the reasons to be described later. The counter 166 thus delivers a first output voltage on its output terminal 166a at a very moment the control voltage generating circuit 32 starts to deliver a first control voltage and simultaneously the output voltage delivered from the monostable multivibrator 170 triggers the counter 166. The first control voltage will disappear when the response switch 62 (FIG. 5) is closed by the examinee responding to the first critical flicker frequency and, thereupon, a second control voltage will be delivered from the control voltage generating circuit 32. The counter 166 responds to this second control voltage and delivers an output voltage on its second output terminal 166b. Output voltages are in this manner delivered in sequence from the counter 166 to the third and fourth output terminals 166c and 166d when the response switch 62 has been closed four times in all and accordingly the fourth control voltage has disappeared, the counter 166 delivers a fifth output voltage on its output terminal 166e, indicating that the operation for collecting the necessary information is complete. The output terminals 166a to 166d are connected to the network 36 of memory circuits and the output terminal 166e connected to the examining circuit 44 (FIG. 3).

Figure 8:
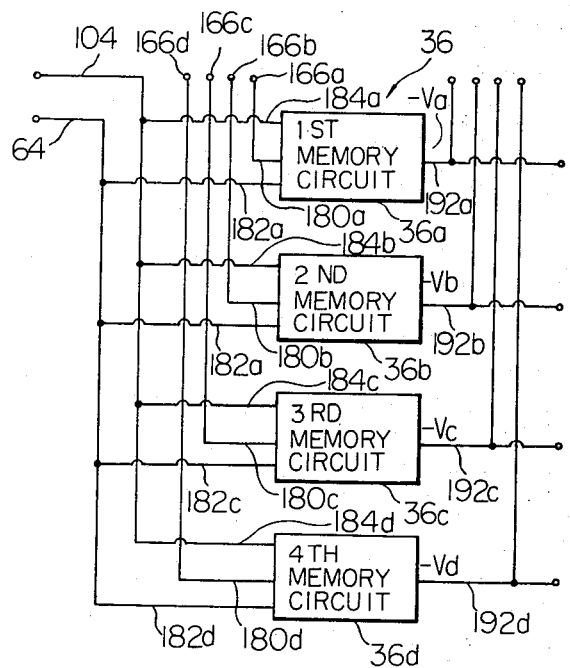
FIG. 8 is a diagram showing, in a block form, a wiring scheme for the memory circuits of the electrical arrangement illustrated in FIG. 3.

The memory circuit network 36 is shown in FIG. 8 as consisting of four memory circuits 36a to 36b which are connected in parallel to the control voltage generating circuit 32 and the counter 166. The memory circuits 36a to 36d are constructed and arranged similarly to each other and, thus, only the construction of the first memory circuit 36a is illustrated in FIG. 9.

Figure 9:
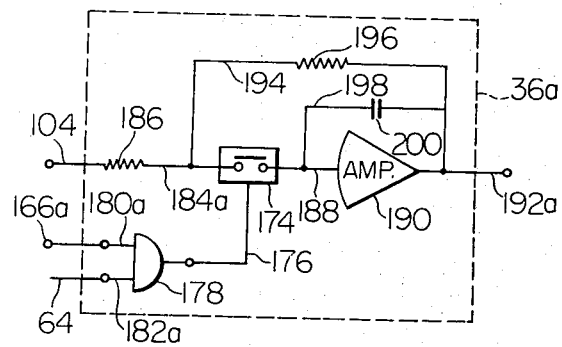
FIG. 9 is a diagram showing a detailed construction of the memory circuits shown in FIG. 8.

Referring to FIG. 9, the memory circuit 36a comprises an electrically operated, normally-open switch 174. The switch 174 has a driver (not shown) which is connected through a line 176 to an AND gate circuit 178 having first and second input terminals 180a and 182a, respectively. The first input terminal 180a of the AND gate circuit 178 is connected to the first output terminal 166a of the counter 166 of the counting circuit 38 shown in FIG. 7 and the second input terminal 182a is connected through the line 64 to the monostable multivibrator 60 of the control voltage generating circuit 32 shown in FIG. 5. The AND gate circuit 178 thus produces an output voltage and accordingly the switch 174 is driven to close when voltages are concurrently present on both of the input terminals 180a and 182a of the AND gate circuit 178. The switch 178 has one end connected through a line 184a having a resistor 186 to the line 104 leading from the integrating circuit 102 of the control voltage generating circuit 32 (FIG. 5). The other end of the switch 174 is connected through a line 188 to an input terminal of an operational amplifier 190 which has an output terminal connected to a line 192a. The switch 174 and the operational amplifier 190 is shunted by a line 194 having a resistor 196 so that the switch 174, the operational amplifier 190 and the resistor 196 form a closed loop when the switch 174 is closed. The operational amplifier 190 is further shunted by a line 198 having a capacitor 200 so that a constantly closed loop is formed by the operational amplifier 190 and the capacitor 200 which are connected in parallel to the resistor 196.

When, now, the switch 174 remains closed with the input terminals 180a and 182a of the AND gate circuit 178 concurrently energized, then, if the resistance values of the resistors 186 and 196 are $r_1$ and $r_2$, respectively, and the capacitance of the capacitor 200 is C, the voltage $V_4$ delivered to the line 192 will be given.

$$V_4 = -(r_2/r_1) \cdot V_1 \qquad \text{Eq. 4}$$

where $V_1$ is the voltage which is delivered from the constant voltage generating circuit 32 to the memory circuit 36. From this it is understood that, when the switch 174 is kept closed, the voltage delivered from the memory circuit 36a eventually becomes proportional to the input voltage of the memory circuit 36a.

When, then, the switch 174 is opened from these conditions, the voltage appearing on the line 192a is maintained by reason of the capacitance of the capacitor 200 or, in other words, the voltage delivered to the memory circuit 36a is "memorized" therein. This condition is brought about in the absence of the voltage on at least one of the input terminals 180a and 182a of the AND gate circuit 178, viz., when a voltage is absent on the first output terminal 166a and/or a voltage is absent on the output terminal of the monostable multivibrator 66 (FIG. 5). Such a condition is maintained in a duration for which the response switch 62 is being closed by the examinee responding to the first occurence of the critical flicker frequency. The critical frequency determined by the examinee in the first cycle of examination is in this manner registered on the memory circuit 36a.

Turning back to FIG. 8, the second, third and fourth memory circuits 36b, 36c and 36d, respectively, are connected to the control voltage generating circuit 32 and the counting circuit 38 in similar manners to the first memory circuit 36a. More specifically, the memory circuits 36b, 36c and 36d have first input terminals 180b, 180c and 180d connected to the output terminals 166b, 166c and 166d, respectively of the counter 166 in the counting circuit 38 similarly to the input terminal 180a shown in FIG. 9, and second input terminals 182b, 182c and 182d connected in parallel to the line 64 leading from the output terminal of the monostable multivibrator 60 of the control voltage generating circuit 32 similarly to the input terminal 182a. The memory circuits 36b, 36c and 36d further have input terminals 184b, 184c and 184d, respectively, which are connected in parallel to the line 104 leading from the integrating circuit 102 of the control voltage generating circuit 32. Designated by reference numerals 192b, 192c and 192d are output terminals of the second, third and fourth memory circuits 36b, 36c and 36d, respectively.

As the response switch 62 (FIG. 5) is closed repeatedly by the examinee, the critical flicker frequencies determined by the examinee are registered on the memory circuits 36a, 36b, 36c and 36d in this sequence and accordingly voltages proportional to these critical flicker frequencies are delivered from the memory circuits 36a to 36d. The voltages thus appearing on the output terminals 192a, 192b, 192c, and 192d are assumed to be $-Va, -Vb, Vc$ and $Vd$, respectively. These voltages are then fed to the mean-value calculating circuit 40 shown in FIG. 10 and the deviation calculating circuit 42 shown in FIG. 11.

Figure 10:
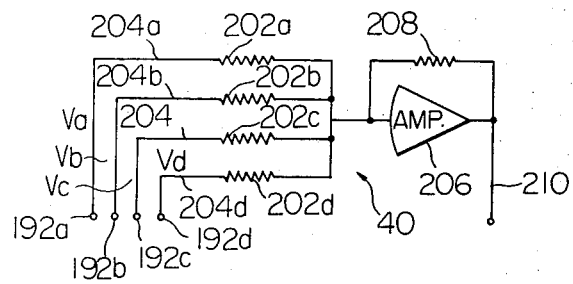
FIG. 10 is a diagram showing a preferred example of the mean-value calculating circuit connected to the memory circuits illustrated in FIG. 8.

Referring to FIG. 10, the mean-value calculating circuit 40 comprises four resistors 202a to 202d which respectively are connected through lines 204a to 204d to the output terminals 192a to 192d of the memory circuits 36a to 36d. These resistors 202a to 202d are connected in parallel to an input terminal of an operational amplifier 206 which is shunted by a resistor 208. The combination of the parallel resistors 202a to 202d, the operational amplifier 206 and the resistor 208 thus forms an adding circuit. The operational amplifier 206 and the resistor 208 are connected in parallel to a line 210.

The resistor 202a to 202d have a common resistance value which is equal to four times the resistance value of the resistor 208 so that, if the voltage appearing on the line 210 is $\bar{V}$, then the following relation will hold $$\bar{V} = (Va + Vb + Vc + Vd)/4 \qquad \text{Eq. 5.}$$

It therefore follows that the voltage $\bar{V}$ appearing on the line 210 is an arithmetic mean of the voltages $Va$, $Vb$, $Vc$ and $Vd$ which are fed to the circuit 40 from the memory circuits 36a to 36d.

Figure 11:
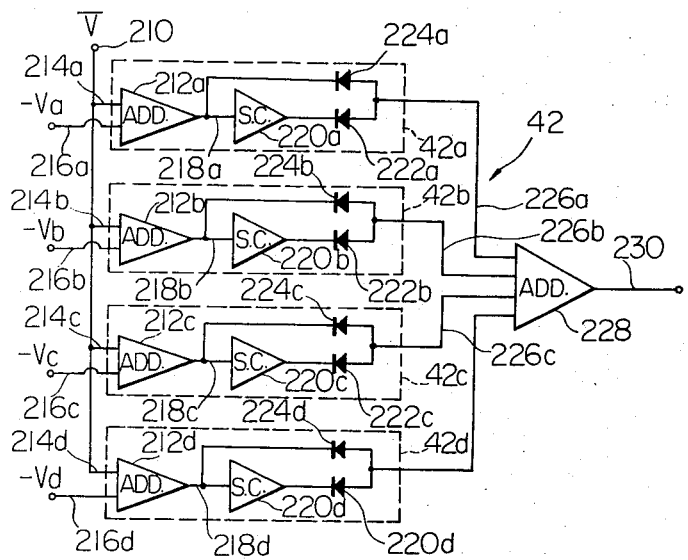
FIG. 11 is a diagram showing a preferred example of the average deviation calculating circuit connected to the circuits illustrated in FIGS. 8 and 10.

The deviation calculating circuit 42 shown in FIG. 11, on the other hand, comprises four calculating units 42a to 42d each of which is indicated by broken lines. These calculating units 42a to 42d are constructed and arranged similarly to each other. Thus, the first calculating unit 42a comprises an adder 212a having first and second input terminals 214a and 216a, respectiely. The first input terminal 214a is connected to the line 210 of the mean-value calculating circuit 40 shown in FIG. 10 and the second input terminal 216a connected to the output terminal 192a of the first memory circuit 36a shown in FIG. 9. The adder 212a has an output terminal which is connected through a line 218a to a signal converter 220a. The signal converter 220 in turn is shunted by first and second diodes 222a and 224a which are serially connected to each other across the signal converter 220a. The first diode 222a has a cathode terminal connected to the output terminal of the signal converter 220a and an anode terminal connected to the anode terminal of the second diode 224a which has its cathode terminal connected to the line 218a, as illustrated. A line 226a providing an output terminal of the calculating circuit 42a is connected to a node between the anode terminals of the diodes 222a and 224a.

Similarly to the first calculating unit 42a above described, the second to fourth calculating units 42b and 42d have adders 212b to 212d having first input terminals 214b to 214d and second input terminals 216b to 216d, respectively. The first input terminals 214a to 214d of the four adders 212a to 212d, respectively, are connected in parallel to the 210 of the mean-value calculating circuit 40 (FIG. 10) and the second input terminals 216a to 216d are connected to the output terminals 192a to 192d of the memory circuits 36a to 36d, respectively. The first input terminals 214a to 214d thus commonly receive the voltage $\bar{V}$ (Eq. 5) while the second input terminals 216a to 216d respectively receive voltages $-Va, -Vb, -Vc$ and $Vd$. The adders 212a to 212d consequently deliver on lines 218a to 218d output voltages which are respectively equal to $Va-\bar{V}$, $Vb-\bar{V}$, $Vc-\bar{V}$ and $Vd-\bar{V}$. The adders 212b to 212d are connected through the 218b to 218d to signal converters 220b to 220d similarly to the adder 212a, so that voltages equal to $\bar{V}-Va, \bar{V}-Vb, \bar{V}-Vc$ and $\bar{V}-Vd$ are delivered from the signal converters 220a to 220d, respectively. The adders 220b to 220d are associated with combinations of diodes 222b and 222d, 222c and 224c, and 222d and 224d, respectively, which are connected in manners similar to the diodes 222a and 224a of the first calculating unit 42a. The second to fourth calculating units 42b to 42d have output terminals which are connected to lines 226b to 226d similarly to the first unit 42a.

By reason of the particular connections of the diodes 222a and 224a in the first calculating unit 42a, a voltage equal to $-|Va-\bar{V}|$ will be delivered to the line 226a and, likewise, voltages equal to $-|Vb-\bar{V}|$, $-|Vc-\bar{V}|$, and $-|Vd-\bar{V}|$ will be delivered to the lines 226b to 226d, respectively, as will be readily appreciated. The units 42a to 42d are thus circuits that calculate the absolute values of the sums of the arithmetic mean of the voltages $Va$ to $Vd$ and the voltages $-Va$ to $-Vd$.

The lines 226a to 226d are connected in parallel to an input terminal of an adder 228 which is constructed similarly to the mean-value calculating circuit 40 shown in FIG. 10, producing an output voltage which is an arithmetic mean of the above mentioned voltages delivered to the input terminal of the adder 228. The output voltage is delivered to a line 230 which is connected to the examining circuit 44 (FIG. 3).

The output voltage $Vo$ thus delivered from the adder or mean-value calculating circuit 228 is, as will be apparent from the above discussion, expressed in the form $$Vo = \frac{\sum_{j=1}^{4} |V_j - \bar{V}|}{4}. \quad (6)$$

Thus, the voltage delivered from the circuit 42 is an average deviation of the voltages produced from the memory circuit network 36 about the voltage delivered from the mean-value calculating circuit 40 and is accordingly representative of an average deviation of the critical flicker frequencies determined by the examinee about the arithmetic mean of the frequencies. When desired, however, the deviation calculating circuit 42 may be so constructed as to work out a standard deviation of the critical flicker frequencies about the arithmetic mean of the frequencies.

The output voltages from the mean-value calculating circuit 40 and the deviation calculating circuit 42 are then fed to the examining circuit 44 so as to decide on whether or not the critical flicker frequencies determined by the examinee are on acceptable levels.

Figure 12:
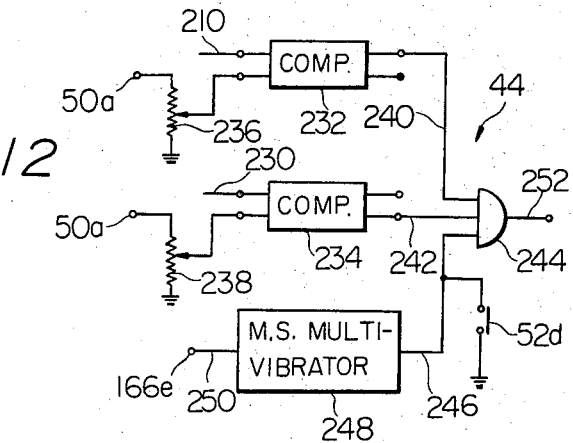
FIG. 12 is a diagram showing a preferred example of an examining circuit forming part of the arrangement shown in FIG. 3.

Referring to FIG. 12, the examining circuit 44 comprises first and second comparators 232 and 234, respectively, each having two input terminals. One input terminal of the first comparator 232 is connected to the line 210 of the mean-value calculating circuit 40 (FIG. 10) and the other input terminal thereof is connected to a variable resistor 236. The variable resistor 236 is grounded at one end and connected at the other to the positive output terminal 50a of the constant-voltage generator 50 of the power supply circuit 30 (FIG. 4). The variable resistor 236 thus provides a prescribed reference voltage to the comparator 232. Likewise, one input terminal of the second comparator 234 is connected to the line 230 of the deviation calculating circuit 42 shown in FIG. 11 and the other terminal thereof is connected to a variable resistor 238. Similarly to the variable resistor 236, the variable resistor 238 is grounded at one end and connected to the positive output terminal 50a of the constant-voltage generator 50 (FIG. 4), providing a prescribed reference voltage to the comparator 234.

The first comparator 232 is adapted to produce an output voltage if and when the input voltage delivered from the line 210, viz., from the mean-value calculating circuit 40 is higher than the prescribed reference voltage determined by the variable resistor 236. The second comparator 234, on the other hand, is operative to produce an output voltage if and when the voltage delivered thereto from the line 230, viz., from the deviation calculating circuit 42 is lower than the prescribed reference voltage which is determined by the variable resistor 238. The first and second comparators 232 and 234 have output terminals 240 and 242, respectively, to input terminals of an AND gate circuit 244. This AND gate circuit 244 has a third input terminal which is connected through a line 246 to an output terminal of a monostable multivibrator 248. The monostable multivibrator 248 has an input terminal connected through a line 250 to a fifth output terminal 166e of the counter 166 of the counting circuit 38 illustrated in FIG. 7. The multivibrator 248 is adapted to deliver an output voltage of a predetermined duration on the line 246 when an input voltage is fed thereto from the fifth output terminal 166e of the counter 166, viz., at an instant the response switch 62 (FIG. 5) has been closed four times by the examinee so that four pieces of information have veen stored in and supplied from the deviation calculating circuit 42. When, thus, voltages are concurrently present on all of the lines 240, 242 and 246, the AND gate circuit 244 delivers an output signal on its output line 252, indicating the fact that the results of the examination are acceptable. To preclude erroneous operation of the AND gate circuit 244, the line 246 may be shunted to ground across normally-closed contacts 52d which are caused to open when the relay 52 in the power supply circuit 30 shown in FIG. 4 is energized with the examination-start switch 54 closed.

From the above discussion, it will be understood that the output voltage is produced from the examining circuit 44 when, and only when, the response switch 62 (FIG. 5) has been closed a predetermined times, the arithmetic mean of the critical flicker frequencies determined by the examinee is larger than a predetermined level (which is selected through varying the resistance value of the variable resistor 236), and the average or standard deviation of the critical flicker frequencies about the mean thereof is smaller than a predetermined level (which is selected through varying the resistance value of the variable resistor 238).

Figure 13:
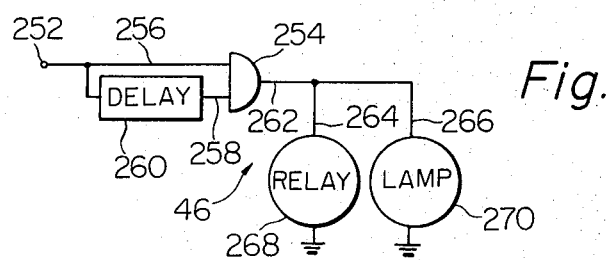
FIG. 13 is a diagram showing a preferred example of the signal holding circuit which may be incorporated by preference into the arrangement illustrated in FIG. 3.

The arrangement consisting of the circuits 30 to 44 above described is adapted to determine whether or not the examinee has a proper control over an intended mental operation, viz., the degree of fatigue or drunkness of the examinee is lower than an acceptable level. Where desired, such an arrangement may be further provided with a circuit which is capable of maintaining the output signal from the examining circuit for providing visual or other confirmation of the result of the examination for a predetermined period of time. FIG. 13 illustrates a preferred example of the signal holding circuit which is adapted to achieve this end.

Referring to FIG. 13, the signal holding circuit 46 comprises an OR gate circuit 254 having two input terminals. One input terminal of the OR gate circuit 254 is connected to a line 256 and the other input terminal thereof is connected through a line 258 to a delay circuit 260. The line 256 and the delay circuit 260 are connected in parallel to the output terminal 252 of the AND gate circuit 244 of the examining circuit 44 shown in FIG. 12. The OR gate circuit 254 has an output terminal connected to a line 262 and thus delivers an output voltage to the line 262 when at least either of the lines 256 and 258 receives an input signal. The delay circuit 260 is adapted to produce an output voltage when a voltage is applied to its input terminal and to continue to deliver the output voltage to the line 258 for a predetermined period of time after the input voltage impressed thereon has disappeared and even though the main switch 58 of the power supply circuit 30 (FIG. 4) is open.

The line 262 is connected in parallel to lines 264 and 266 in which a relay 268 and an indication lamp 270 are interposed respectively. The relay 268 is assumed to have a self-holding characteristics.

When, thus, the AND gate circuit 244 of the examining circuit 44 (FIG. 12) delivers to the line 252 a signal voltage of a pulsating waveform, then the OR gate circuit 254 receives input voltages at both of its input terminals connected to the line 256 and the delay circuit 260. An output voltage is consequently delivered from the OR gate circuit 254 to the line 262. The output voltage on the line 262 is maintained for a predetermined period of time by reason of the previously described function of the delay circuit 260. The relay 268 is thus kept energized and the indication lamp 270 is maintained to glow once the output voltage is delivered from the OR gate circuit 254.

In case the main switch 58 of the power supply circuit 30 (FIG. 4) is opened upon completion of the examination accepting the examinee and is thereafter closed for a second time, no voltage will be present on the line 256 connected to one input terminal of the OR gate 254 but, because of the previously describd function of the delay circuit 260, the relay 268 and the indication lamp 270 will remain energized for a predetermined period of time. The result of the examination accepting the examinee is in this manner displayed for a certain period of time after the examination has been completed.

The relay 268 is intended to control, in accordance with the result of the examination, any equipment which may be operatively associated with the arrangement thus far described. As has been noted at the outset of the disclosure, the examining apparatus according to the present invention is advantageous especially for the purpose of inspecting the mental control of those who are about to operate a motor vehicle or aircraft. Where the examining apparatus according to the present invention is to be used for such a purpose, the arrangement thus far described may additionally include an inhibiting circuit which is adapted to hold inoperative a power plant of the motor vehicle or aircraft when the result of the examination indicates that the examinee is rejected from the intended operation, viz., the examining circuit 44 (FIG. 12) fails to deliver an output voltage. A preferred example of such an inhibiting circuit is illustrated in FIG. 14.

Figure 14:
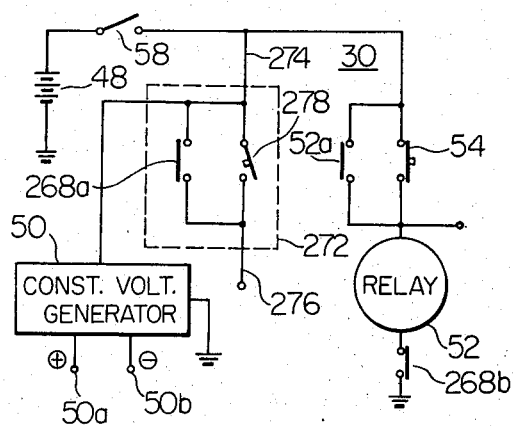
FIG. 14 is a diagram showing a preferred example of a circuit arrangement which may be connected to the power supply circuit shown in FIG. 4 for the purpose of holding a vehicle power plant inoperative when the examinee fails to be accepted by the arrangement shown in FIG. 3.

Referring to FIG. 14, the inhibiting circuit generaly designated by reference numeral 272 as indicated by broken lines is incorporated into the power supply circuit 30 which has been described with reference to FIG. 30, like reference numerals thus indicating corresponding elements in both figures. The power supply circuit 30 is, in this instance, intended not only to supply the d.c. power to the electrical arrangement including the circuits shown in FIGS. 4 to 13 but electrically operated elements, such as for example, elements of an ignition system, of the power plant.

The inhibiting circuit 272 comprises a line 272 connected across the main switch 58 to the d.c. power source 48. The line 274 is connected in parallel to the previously described constant-voltage generator 50 and through normally-open contacts 268a to a line 276 which, in turn, is connected to an appropriate electrically-operated element (not shown) associated with the power plant (not shown) of the motor vehicle or aircraft. The normally-open contacts 268 are associated with the relay 268 of the signal holding circuit 46 illustrated in FIG. 13 and is thus caused to close when the relay 268 remains energized from the delay circuit 260 (FIG. 13).

The inhibiting circuit 272 being constructed in this manner, the electrically-operated element associated with the power plant can not be energized from the d.c.

power source 48 even though the main switch 58 is closed, unless the contacts 268a of the relay 268 (FIG. 13) are closed in response to an output signal supplied from the examining circuit 44 or, in other words, unless the examinee has been accepted in the test.

Where it is desired that the power plant be permitted to be started only for idling before the examination is terminated, the inhibiting circuit 272 may further include a switch 278 which is connected to a transmission gearshift lever or a parking brake (not shown) or any operational member associated therewith. The switch 278 is arranged in such a manner that it is permitted to close in response to the condition of the gearshift lever selecting a neutral position of the transmission or to the coupled condition of the parking brake. The engine can thus be started for idling operation before the examination is complete or when the examinee or the intending driver has been rejected, insofar as the transmission gearhsift lever is in the neutral position or the parking brake is in the coupled position. If, however, the gearshift lever is moved to positions other than the neutral position or the parking brake is operated to the coupled position before the examination is complete or when the examinee has been proved to be unacceptable, the switch 278 is caused to open so that the line 276 is disconnected from the power source 48.

Designated by reference numeral 268b are normally closed contacts of the relay 268 in the signal holding circuit 46 (FIG. 13). The contacts 268b are connected between the relay 52 of the power supply source 30 and ground and are caused to open when the relay 268 is kept energized.

The constructions of the individual circuits making up the electrical arrangement of the apparatus according to the present invention will have been clearly understood from the foregoing description. For the clearer understanding of the various outstanding features of the apparatus according to the present invention, description will now be made on the operation of the overall electrical arrangement of the apparatus with concurrent reference to FIGS. 4 to 14 and further to FIGS. 15 and 16 which illustrate various waveforms of the voltages appearing on the lines of the circuits.

Figure 15:
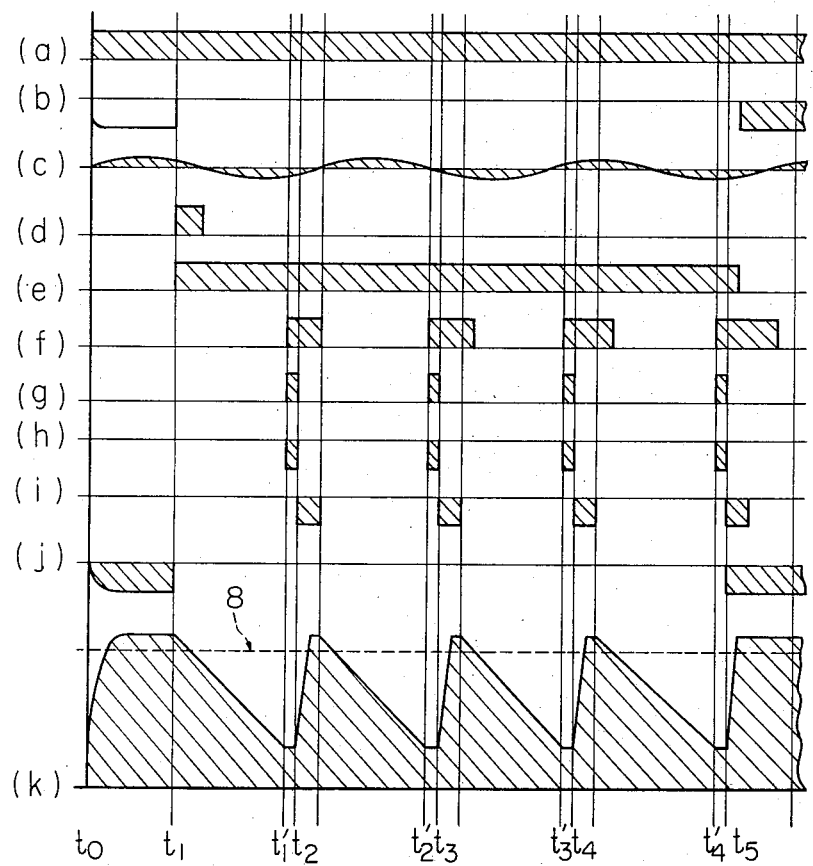
FIGS. 15 and 16 are views indicating waveforms of voltages appearing at various lines of the circuits shown in FIGS. 4 to 14.
Figure 16:
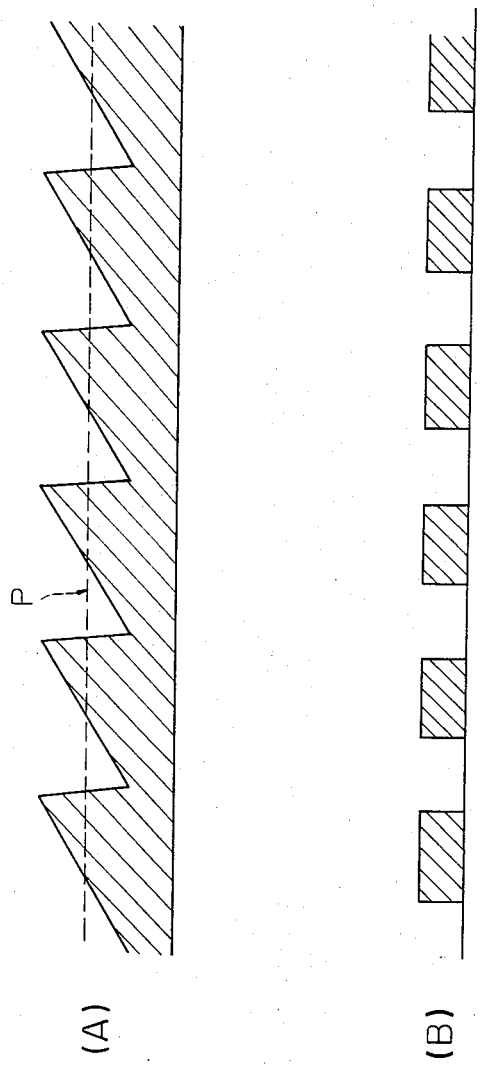

When, now, the main switch 48 is in the power supply circuit 30 shown in FIG. 4 is closed by the examinee who is about to operate the motor vehicle or aircraft, then the constant-voltage generator 50 delivers positive and negative voltages at its output terminals 50a and 50b as indicated by waveforms (a) and (b) in FIG. 15. Simultaneously, the lower-frequency generator 94 in the control voltage generating circuit 32 (FIG. 5) produces an output voltage having a sinusoidal waveform (c) indicated in FIG. 15. The time at which the main switch 48 is closed is indicated by $t_o$ in FIG. 15. The voltages thus appearing on the lines 88, 90 and 92 in the control voltage generating circuit 32 are added together to produce a voltage having a waveform (j) indicated in FIG. 15 and integrated by the combination of the feedback capacitor 96 and the operational amplifier 98 into a voltage having a waveform (k) shown in FIG. 15. As a consequence, the light-emissive diode 158 produces flashes which are perceived by the examiner as a continuous illumination as will be understood from the waveform (k) in FIG. 15.

When, then, the examination-start switch 54 is closed by the examinee at time $t_1$ for a period indicated by waveform (d) in FIG. 15, the relay 52 is energized from the d.c. power source 58 so that the normally-open contacts 52a (FIG. 4), 52c (FIG. 6) and 52d (FIG. 12) are caused to close and the normally closed contacts 52b (FIG. 5) is caused to open. The line 86 in the control voltage genertering circuit 32 is consequently disconnected from the negative output terminal 50b of the constant-voltage generator 50 and, at the same time, an output voltage is delivered to the line 56 of the power supply circuit 30. The voltage thus appearing on the line 56 is maintained for a period of time even after the examination-start switch 54 has been opened, as indicated by a waveform (e) in FIG. 15.

The output voltage from the control voltage generating circuit then varies or decreases as indicated by waveform (k) in FIG. 15. The waveform (k) is herein assumed to continuously decreases from its peak as the time lapses, but, where desired, the output voltage from the circuit 32 may have any other waveform which may, for example, increase from a bottom value. The waveform of the voltage delivered from the control voltage generating circuit 32 will be determined by selecting the waveform of the voltage supplied from the low-frequency oscillator 82, the resistance values of the resistors 88 to 92, and/or the performance characteristics of the feedback capacitor 96 and/or the operational amplifier 98.

The voltage thus appearing on the line 104 of the control voltage generating circuit 32 is applied to the pulse shaping circuit 34 illustrated in FIG. 6 and is converted by the oscillator circuit 144 into a train of pulses having a frequency which is substantially proportional to the voltage initially supplied to the pulse shaping circuit 34. Since, in this instance, the current flowing through the resistor 138 in the pulse shaping circuit 34 is constant as previously ascertained from Eq. 3, the pulses delivered from to the line 148 (FIG. 6) occur in the form of a sawtooth waveform which is illustrated in (A) of FIG. 16. If, therefore, the variable resistor 154 of the pulse shaping circuit 34 is so set as to supply the comparator 146 with a reference voltage having an amplitude indicated by broken line p in (A) of FIG. 16, then the comparator 146 will produce output voltages of durations which are indicated in (B) of FIG. 16. The light-emissive diode 158 is consequently energized with the pulses indicated in (B) of FIG. 16 and thus flickers at a frequency varying in proportion to the amplitude of the waveform (k) in FIG. 15.

While the light-emissive diode 158 is caused to flicker in this manner, the output voltage delivered from the control voltage generating circuit 32 through the line 104 is fed to one input terminal of the comparator 160 of the counting circuit 38 (FIG. 7). The variable resistor 164 is connected to the other input terminal of this comparator 160 is so set that the reference voltage thereby determined is appropriately lower than the peak value of the voltage supplied from the control voltage generating circuit 32 as indicated by a broken line q on the waveform (k) of FIG. 15. The comparator 160 accordingly produces an output voltage in response to the peak value of the control voltage supplied from the circuit 32. The counter 166 thus delivers an output voltage on its first output terminal 166a so that a voltage is present on one of the input terminals of the AND gate circuit 178 of the first memory circuit 36a (FIG. 9).

When, then, the examinee closes the response switch 62 (FIG. 5) at time $t_1'$ so as to determine the critical flicker frequency in the first cycle of the examination process, the monostable multivibrator 60 of the control voltage generating circuit 32 becomes energized for a period of time indicated by (f) of FIG. 15 so that a positive signal voltage indicated by (g) is produced from the multivibrator 60. The signal voltage thus supplied from the monostable multivibrator 60 is fed on one hand to the AND gate circuit 178 of the first memory circuit 36a (FIG. 9) and on the other hand to the second monostable vibrator 68 and the signal converter 80 of the control signal generating circuit 32 (FIG. 5). Since, in these conditions, voltage from the first output terminal 166a of the counter 166 (FIG. 7) is present on one input terminal of the AND gate circuit 178 of the first memory circuit 36a as above noted, the AND gate circuit 178 delivers an output voltage on the line 176, closing the switch 174. The voltage produced by the control voltage generating circuit 32 at an instant the response switch 62 is closed or the signal voltage indicted by (g) in FIG. 15 is produced by the monostable multivibrator 60 is in this manner registered on the memory circuit 36a. When the output voltage from the multivibrator 60 disappears, then the AND gate circuit 178 becomes non-conducting to cause the switch 174 to open and at the same time the monostable multivibrator 68 connected to the multivibrator 60 produces a negative signal voltage as indicated by (i) in FIG. 15. The control voltage delivered from the control voltage generating circuit 32 accordingly rises to the peak value at time $t_2$ and varies for second time until the response switch 62 is closed at time $t_2'$ by the examinee at the end of the second examination proces. The voltage delivered from the control voltage generating circuit 32 is then registered in the second memory circuit 36b in manners similar to those in the first cycle of the examination. Information is thus stored in the third and fourth memory circuits 36c and 36d, respectively, as the light-emissive diode 158 (FIG. 6) is caused to flicker in accordance with the control voltage having the waveform (k) as the time lapses from time $t_3$ to $t_3'$ in the third cycle of the examination and from time $t_4$ to $t_4'$ in the fourth cycle of the examination. As previously discussed in detail, the voltages which have been stored in the memory circuits 36a to 36d (FIG. 8) are fed on one hand to the mean-value calculation circuit 40 shown in FIG. 10 for producing a voltage representative of the arithmetic means of the critical flicker frequencies determined by the examinee and on the other hand to the deviation calculating circuit 42 shown in FIG. 11 for producing an average deviation of the determined critical flicker frequencies about the mean thereof. The voltages thus representative of the arithmetic meanand the average deviation of the critical flicker frequencies are supplied to the input terminals of the AND gate circuit 244 of the examining circuit 44 shown in FIG. 12.

The monostable multivibrator 248 connected to the third input terminal of the AND gate circuit 244 of the examining circuit 244 is connected to the fifth output terminal 166e of the counter 166 in the counting circuit 38 (FIG. 7) and is, thus, energized when the voltage from the control voltage generating circuit 32 arises to the peak value at time $t_5$ after the four cycles of the examination have terminated as seen in (k) of FIG. 15. The AND gate circuit 244 of the examining circuit 44 thus produces an output voltage when it receives signals concurrently from the comparators 232 and 234 and the multivibrator 248 or, in other words, when the predetermined number of cycles of the examination process are complete and at the same time the results of the examination are proved to be acceptable. The relay 268 and the indication lamp 270 of the signal holding circuit 46 shown in FIG. 13 are then energized, providing a visual indication of the examination and permitting the d.c. power source 48 (FIG. 1) to be connected to the electrically operated equipment of the power plant, as previously noted.

The reliability of the result of the examination achieved by the apparatus thus far described stem largely from the provision of the deviation calculating circuit 42 and the low-frequency oscillator 94 in the control voltage generating circuit 32.

Provided the arithmetic mean alone of the critical flicker frequencies is to be derived and used as a criterion to decode on a mental control of the examinee, a misleading result would be achieved if the examinee tries to close the response switch 62 at a timing earlier than the moment at which the examinee actually recognizes the critical flicker frequency. In this instance, the apparatus may produce a signal accepting the examinee who actually is unworthy of acceptance and will thus fail to assure reliability of the examination. The critical flicker frequencies determined in this manner will, however, have a considerably large deviation about the arithmetic mean thereof and is accordingly considered useful for the purpose of precluding a "got-up" testing. Thus, examinee will be rejected upon examination if the average deviation of the critical flicker frequencies is larger than a prescribed level even though the arithmetic mean of the critical flicker frequencies is on an excellent level.

The provision of the low-frequency oscillator 94 is also intended to preclude the examinee's guesswork in determining the critical flicker frequencies during examination. If the flicker is produced with a frequency which is to vary regularly or in a fixed pattern in every examination or in every cycle of the examination then the examinee will become accustomed to the timing of appearance of the critial flicker frequency and will thus acquire techniques that enable him to relatively accurately determine the critical flicker frequency by a mere guesswork or on a rule of thumb. The result of the examination obtained in this manner will be also misleading. By reason, however, of the fact that the frequencies of the flickers produced in the successive cycles of the examination are varied practically irregularly or in an unforeseen manner by means of the sinusoidally or otherwise varying component in the control voltage from the control voltage generating circuit 32, the examinee is required to at all times alert on the variation of the flicker in every cycle of the examination. Similar results may be also achieved by varying at random the resistance value provided by the variable resistor 154 supplying the reference voltage for the comparator 146 in the pulse shaping circuit 34 (FIG. 6).

What is claimed is:

1. An apparatus for examining a mental control of an examinee, comprising light-emissive means for producing light when electrically energized, power supply means including a first switch means for self-holding characteristids, said first switch means being closed for starting the examining operation, a control voltage generating circuit including a second switch means to be closed by the examinee in response to an appearance of a critical flicker frequency on said light-emissive means and connected to said power supply means through said first switch means for producing successive control voltages each having a waveform which varies continuously with time until said second switch means is closed, a pulse shaping circuit connected between said light-emissive means and said control voltage generating circuit for producing pulses of a repetition rate which is substantially proportional to the control voltage and for thereby energizing the light-emissive means at a frequency proportional to said repetition rate, a multiplicity of memory circuits each connected to said control voltage generating circuit and responsive to the closing of said second switch means for registering therein the voltage produced by said control voltage generating circuit at an instant when said second switch means is closed by the examinee in response to the critical flicker frequency during presence of each of said control voltages, a counting circuit for monitoring the number of times the second switch means are closed after said first switch means has been closed for and causing said memory circuits to sequentially register the voltages they receive from said control voltage generating circuit at the instants when the second switch means is closed, a mean-value calculating circuit having input terminals connected respectively to output terminals of said memory circuits for producing an output voltage representative of a mean value of the voltages registered on the memory circuits, a deviation calculating circuit having input terminals connected respectively to the output terminals of said memory circuits and to an output terminal of said mean-value calculating circuit for producing an output voltage representative of a deviation of the voltages fed from said memory circuits about the output voltage from said mean-value calculating circuit and an examining circuit for determining the output voltages from said mean-value and deviation calculating circuits are on acceptable levels.

2. An apparatus as claimed in claim 1, further comprising a signal holding circuit connected to an output terminal of said examining circuit and including a third switch means of self-holding characteristics, said third switch means being operative to remain closed for a predetermined period of time after the third switch means has been once energized and then de-energized.

3. A combination with an apparatus as claimed in claim 2, of an electric line which is connected across a normally open-switch means between said power supply means and any of the electrically operated elements of a power plant of a power driven equipment, said normally-open switch means being closed in response to closing of said third switch means so that the electrically operated element of the power plant is energized from said power supply means when said third switch means is closed.

4. An apparatus as claimed in claim 1, in which said control voltage generating circuit comprises a low-frequency generator for producing in the output voltage produced by the control voltage generating circuit a component having a waveform that varies with time.

5. An apparatus as claimed in claim 4, in which said control voltage generating circuit further comprises a first monostable multivibrator connected through said second switch means to said power supply means for producing an output voltage when the second switch means is closed, a second monostable multivibrator having an input terminal connected to an output terminal of said first monostable multivibrator for producing an output voltage when said output voltage of the first monostable multivibrator disappears, a signal converter connected to the ouput and input terminals respectively of said first and second monostable multivibrator, and an integrating circuit having an input connected in parallel to output terminals of said second monostable multivibrator, said signal converter and said low-frequency generator and to positive and to said power supply means, said integrating circuit having an output terminal through which said control voltages are delivered in sequence.

6. An apparatus as claimed in claim 5, in which said integrating circuit comprises a feedback capacitor and an operational amplifier connected in parallel between the input and output terminals of the integrating circuit.

7. An apparatus as claimed in claim 6, in which said integrating circuit further comprises a voltage limiter for limiting the control voltage delivered from the integrating circuit within a predetermined range.

8. An apparatus as claimed in claim 6, in which said integrating circuit further comprises resistors through which said power supply means, said second monostable multivibrator, said signal converter and said low-frequency generator are connected in parallel to said input terminal of said integrating circuit.

9. An apparatus as claimed in claim 5, in which said control voltage generating circuit further comprises a third switch means connected between the input terminal of said integrating circuit and the negative output terminal of said power supply means, said third switch means being open in response to closing of said second switch means.

10. An apparatus as claimed in claim 1, in which said pulse shaping circuit comprises a circuit having an input terminal connected to the output terminal of said control voltage generating circuit for producing a constantly proportional to the output voltae delivered from said control voltage generating circut, an oscillating circuit connected to said constant-current generating means for producing an output voltage having a sawtooth waveform, and a comparator connected to said oscillating circuit for comparing the output voltage from the oscillating circuit with a predetermined reference voltage and producing pulses when the former is higher than the latter, said pulses having said repetition rate which is substantially proportional to the control voltage supplied to the pulse shaping circuit from said control voltage generating circuit.

11. An apparatus as claimed in claim 1, in which each of said memory circuits comprises a third switch means operative to be closed in response concurrently to closing of said second switch means and to delivering of the control voltage from said control voltage generating circuit and a voltage registering circuit having an input terminal connected through said third switch means to the output terminal of said control voltage generating circuit and an output terminal connected to said mean-value and deviation calculating circuits.

12. An apparatus as claimed in claim 11, in which said voltage registering circuit comprises a capacitor and an operational amplifier which are connected in parallel between said third switch means and the output terminal of the voltae registering circuit and a resistor shunting said third switch means and said operational amplifier and said capacitor.

13. An apparatus as claimed in claim 1, in which said mean-value calculating circuit comprises a parallel connection of a resistor and an operational amplifier connected the output terminal of each of said memory circuits.

14. An apparatus as claimed in claim 1, in which said deviation calculating circuit comprises a multiplicity of absolute value calculating units each comprising an adder having input terminals connected to the output terminal of said mean-value calculating circuit and one of said memory circuits associated with the unit, a signal converter connected to an output terminal of said adder, a first diode having a cathode terminal connected to an output terminal of said signal converter, and a second diode having an anode terminal connected to the anode terminal of said first diode and a cathode terminal connected to the output and input terminals respectively of said adder and said signal converter, and a mean value calculating circuit connected to the anode terminals of the first and second diodes of each of said units for producing an output voltage representative of an arithmetic mean of the voltages supplied from the individual absolute value calculating units.

15. An apparatus as claimed in claim 1, in which said examining circuit comprises a first comparator for comparing the output voltage from said mean-value calculating circuit with a prescribed voltage and producing an output voltage if and when the former is higher than the latter, a second comparator for comparing the output voltage from said deviation calculating circuit with a prescribed reference voltage and producing an output voltage when the former is lower than the latter, and a gating circuit having input terminals respectively connected to output terminals of the first and second comparators for producing an output voltage if and when the output voltages are concurrently produced by the first and second comparators.

16. An apparatus as claimed in claim 15, in which said gating circuit further has an input terminal connected to said counting circuit for producing the output voltage responsive to a predetermined number of times said second switch means has been closed after said first switch means is closed.

17. An apparatus as claimed in claim 2, in which said signal holding circuit further includes a gating circuit having two input terminals one of which is connected directly to the output terminal of said examining circuit and the other of which is connected to the output terminal of the examining circuit through a delay circuit, said gating circuit having an output terminal connected to said third switch means and producing an output voltage when at least either of its input terminals is energized.

\* \* \* \* \*